(12) United States Patent
Boltze

(10) Patent No.: US 7,175,932 B2
(45) Date of Patent: Feb. 13, 2007

(54) FUEL CELL SYSTEM

(75) Inventor: Matthias Boltze, Neubrandenburg (DE)

(73) Assignee: Webasto Thermosysteme GmbH, Neubrandenburg (DE)

( * ) Notice: Subject to any disclaimer, the term of this patent is extended or adjusted under 35 U.S.C. 154(b) by 491 days.

(21) Appl. No.: 10/681,332

(22) Filed: Oct. 9, 2003

(65) Prior Publication Data
US 2004/0131913 A1    Jul. 8, 2004

(30) Foreign Application Priority Data
Oct. 11, 2002    (DE) ................. 102 47 521

(51) Int. Cl.
H01M 8/04    (2006.01)
G05D 11/02    (2006.01)
(52) U.S. Cl. ........................ 429/34; 137/114
(58) Field of Classification Search .............. 429/34, 429/38, 39; 137/114
See application file for complete search history.

(56) References Cited

U.S. PATENT DOCUMENTS 5,213,912 A * 5/1993 Kunz et al. .................. 429/34
5,441,821 A    8/1995 Merritt et al.
6,472,092 B1 * 10/2002 Matsuda et al. .......... 429/38 X
6,706,438 B2 * 3/2004 Sahoda et al. ................ 429/34
6,921,595 B2 * 7/2005 Clawson et al. .......... 429/34 X

FOREIGN PATENT DOCUMENTS

EP    0 800 708 B1    2/2000

* cited by examiner

Primary Examiner—Stephen J. Kalafut
(74) Attorney, Agent, or Firm—David S. Safran

(57) ABSTRACT

A fuel cell system in which fuel is supplied to a fuel cell arrangement and/or a reformer by an injector, where the anode exhaust gas of the fuel cell arrangement is recirculated to the injector. The fuel cell arrangement is connected to an intake opening of the injector which also has an inlet opening, a following nozzle, a following diffuser with an outlet opening and an intake opening for feed of the anode exhaust gas of the fuel cell arrangement. A chamber is formed between the nozzle and the entry area of the diffuser, and a slide is positioned within the chamber to move from a first slide position permitting the passage of the fuel from the nozzle to the outlet opening and a second slide position where the passage of fuel is prevented.

8 Claims, 2 Drawing Sheets

FUEL CELL SYSTEM

BACKGROUND OF THE INVENTION

1. Field of the Invention

The invention relates to a fuel cell system including a fuel cell arrangement and an injector for returning the exhaust gas to the fuel cell arrangement. The injector includes an inlet opening, a following nozzle, a following diffuser with an outlet opening and an intake opening for feed of the anode exhaust gas of the fuel cell arrangement to a chamber which has been formed in the area of the nozzle and the entry area of the diffuser. Furthermore, the invention is directed to a fuel cell system with a fuel cell arrangement, a reformer for reforming a liquid or gaseous fuel into a hydrogen-containing gas and an injector for return of the exhaust gas to the reformer, the injector having an inlet opening, a following nozzle, a following diffuser with an outlet opening and an intake opening for feed of the anode exhaust gas of the fuel cell arrangement to a chamber which has been formed in the area of the nozzle and of the entry area of the diffuser.

2. Description of Related Art

Conventionally, the fuel supplied to the fuel cell is not completely consumed in the fuel cell. That is, an anode gas is formed with the residual fuel gases $H_2$ and CO as well as $N_2$, $CO_2$ and $H_2O$. The anode exhaust gas can be re-burned in a burner and can be released into the atmosphere as an exhaust gas. Another alternative has been recirculation of the anode exhaust gas into the fuel which has been supplied to the fuel cell. For example, in fuel cell systems disclosed in published European Patent EP 0 800 708 and corresponding U.S. Pat. No. 5,441,821, the fuel cell system includes supplying the anode exhaust gas again using injectors to the fuel cell arrangement. The injectors used there are built in the aforementioned manner.

Conventional fuel systems are known which have a reformer by which a hydrogen-containing gas is produced from a liquid or gaseous fuel which is supplied in turn to the fuel cell arrangement as fuel. These fuel cell systems are especially advantageous in mobile use, since the initial fuels for reforming to produce the hydrogen-containing gas can be transported and handled much more easily than the hydrogen, as is used in the system of European Patent EP 0 800 708 and corresponding U.S. Pat. No. 5,441,821. A suitable fuel for a reformer is, for example, gasoline or diesel. In motor vehicles, these systems are advantageous in that the reformer can be operated with the same fuel as the internal combustion engine of the motor vehicle.

The concept of "fuel" which is being used within the framework of this invention comprises not only the energy sources used, but also a fuel mixture composed for example of the energy source and the oxidizer, for example in the form of air, necessary for reforming.

One suitable process for reforming is the so-called partial oxidation method. In this process, the fuel is oxidized with atmospheric oxygen by sub-stoichiometric combustion. The reforming reaction proceeds at high temperatures, in the 1300° C. range. One known problem in partial oxidation is soot formation. The danger of soot formation can be reduced by the addition of water to the fuel which has been supplied, for example, in vapor form, to the reformer. Adding water to the fuel reduces the danger of soot formation. The anode exhaust gas is also suitable for addition for this purpose. That is, water forms on the anode of the fuel cell arrangement, the amount formed being sufficient to reduce soot formation in the reforming process. In order to supply the fuel to the reformer and to mix the fuel with the anode exhaust gas, an injector can be used, as was described above in an application for injection of a fuel into the fuel cell arrangement.

Both when the fuel is being supplied to a fuel cell arrangement and also when a fuel is being supplied to a reformer there is the problem during the starting phase of the system. That is, the supplied fuels are not yet suitable or the reformer and the fuel cell arrangement have not yet reached the necessary operating temperature to enable proper operation. Consequently, the fuel must be prevented from being delivered.

One suitable alternative for the starting phase of the fuel cell system is to divert the fuel before entering the reformer or the fuel cell arrangement and deliver it to a different use. In order to do this, there must be a valve which delivers the fuel either to the reformer or an afterburner. Similarly, there can be such a valve upstream of the fuel cell arrangement.

While this arrangement does solve the problem of the starting phase, this system is comparatively expensive. Additionally, both the valves and the injectors have a complex structure. Moreover, there additional piping is necessary which makes the system structure more complicated and leads to pressure losses and higher costs.

SUMMARY OF THE INVENTION

A primary object of the present invention is to provide a fuel cell system which enables reliable operation in the starting phase and recirculation of the anode exhaust gas, where the anode exhaust gas can be supplied either to the reformer or the fuel cell arrangement.

This object of the invention is achieved by providing a fuel cell system with an injector which is characterized in that the entry area of the diffuser is made as a slide, in the first slide position the passage of the fuel from the nozzle to the outlet opening being enabled and in the second slide position the passage of the fluid from the nozzle to the outlet opening being prevented.

The advantage of the fuel cell systems of the invention is that only a single component is necessary to implement several independent system functions. That is, the specific case the function of a valve is integrated into the injector. In this manner, the installation space of the fuel cell system can be reduced and the production costs can be cut. The simplified piping of the components moreover yields a functional advantage by reducing the pressure drop. Thus, the fuel cell system of the invention is simpler and more economical than the conventional system of providing a single valve and a single injector at a time.

The intake opening of the injector is advantageously connected both to the anode of the fuel cell arrangement for recirculation of the anode exhaust gas and to the burner for diverting the fuel in the second slide position. The heat generated in the burner can then be used to heat up the system.

In one embodiment of the invention, the slide can assume intermediate positions, thereby changing the diffuser geometry. That is, by adjusting the diffuser geometry, the recirculation rate, and, therefore, the ratio of the recirculated anode exhaust gas to the supplied new fuel, can be varied.

The invention is explained in greater detail below with reference to one embodiment and the accompanying drawings.

DETAILED DESCRIPTION OF THE INVENTION

Figure 1:
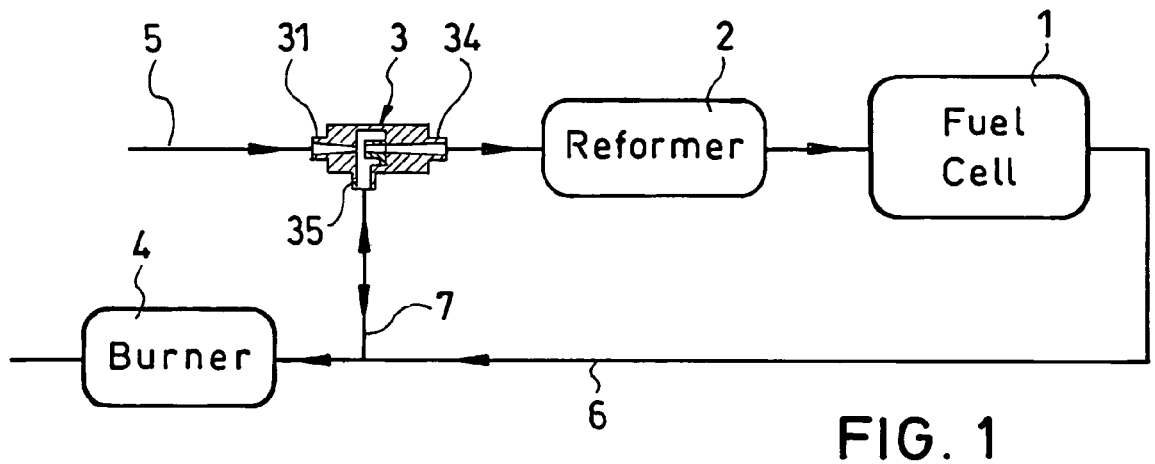
FIG. 1 shows a fuel cell system with an injector for returning the exhaust gas to the reformer.

In the fuel cell system shown in FIG. 1, a liquid or gaseous fuel, e.g., gasoline, is used to produce a hydrogen-containing gas by a reforming reaction. A reformer 2 is provided, and the reformate from the reformer 2 is supplied to the fuel cell arrangement 1. The fuel cell arrangement 1 has connections (not shown) by which the electrical current produced can be directly tapped. In the supply of the fuel to the reformer 2, there is an injector 3 which accelerates the fuel supplied via a line 5 and thus reduces the static pressure. This negative pressure makes enable the intake the anode exhaust gas via the intake opening 35 and the line 7. In the diffuser 33, the pressure rises again. The injector 3 in this embodiment can be supplied, via the fuel line 5, not only with fuel, but also with a fuel-air mixture which is to be delivered to the reformer 2.

This mode of operation is steady-state when all components of the fuel cell system are at the operating temperature.

In the embodiment shown, more exhaust gas is produced on the anode of the fuel cell arrangement 1 than can be returned again to the reformer 2 by the injector 3. The remaining anode exhaust gas is supplied to a burner 4 which burns the excess anode gas. The exhaust gas of the burner 4 can be released into the environment.

The injector 3 in the fuel cell system of the invention also enables a second operating mode of the fuel cell system. In the second operating mode, the connection between the inlet opening 31 of the injector and the outlet opening 34 is interrupted. Instead, the fuel which has been supplied via the fuel line 5 is routed instead to the intake opening 35 of the injector via which anode exhaust gas is supplied in the above described first operating mode. In this second operating mode, the injector 3 functions as a valve.

During the second operating mode, the fuel emerging through the intake opening 35 is supplied to the burner 4 via the line section 7. No special measures are necessary for the connection between the line section 7 and the anode exhaust gas line 6 since, in the valve operating mode of the injector 3, the line branch via the reformer 2 and the fuel cell arrangement 1 is unused. The fuel transported from the injector 3 to the burner 4 therefore cannot penetrate into the anode exhaust gas line 6 so that it reaches the fuel cell arrangement 1.

Figure 2:
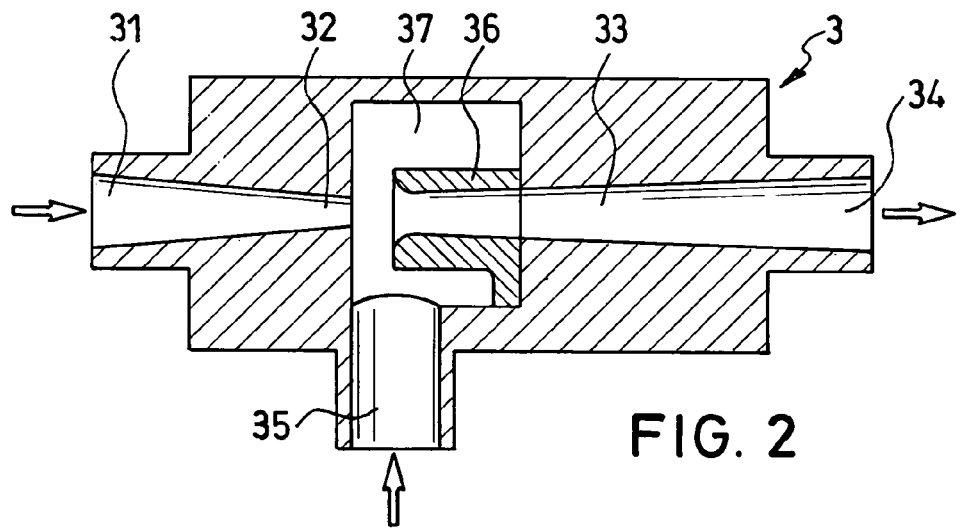
FIG. 2 shows a detailed representation of the injector in the first slide position.

FIG. 2 illustrates a detailed representation of the structure of the injector 3. In conjunction with FIG. 3 it is apparent how switching between the two operating modes of the injector 3 functions. On the side of the injector 3 which is on the left in FIG. 2 there is an inlet opening 31 which tapers in the direction of the outlet opening 34 and discharges into a nozzle 32. In the right half of the injector 3, a diffuser 33 is formed, with a cross section which widens in the direction of the outlet opening 34.

In the area of the nozzle 32 and the entry area of the diffuser 33, a chamber 37 is formed and to which the intake opening 35 is connected. The line section 7 of the fuel cell system is in turn connected to the intake opening 35. Additionally, a slide 36 in the fully open position in FIG. 2 is provided within the chamber 37 in entry area of the diffuser 33 into which the fuel emerging from the nozzle 32 travels.

The fuel flow which passes through the nozzle 32 has a high velocity and a low pressure on the nozzle outlet and in the chamber 37. The anode exhaust gas entering through the intake opening 35 conversely has a comparatively higher pressure. Therefore, in the first operating mode, the fuel flow which emerges from the nozzle 32 intakes the anode exhaust gas. The fuel and the anode exhaust gas are then mixed as they flow into the diffuser 33. The ratio of the fuel which passes through the nozzle 32 and of the anode exhaust gas which is taken in by the fuel flow depends on the geometry of the nozzle 32 and the diffuser 33. This ratio is normally not adjustable.

Figure 3:
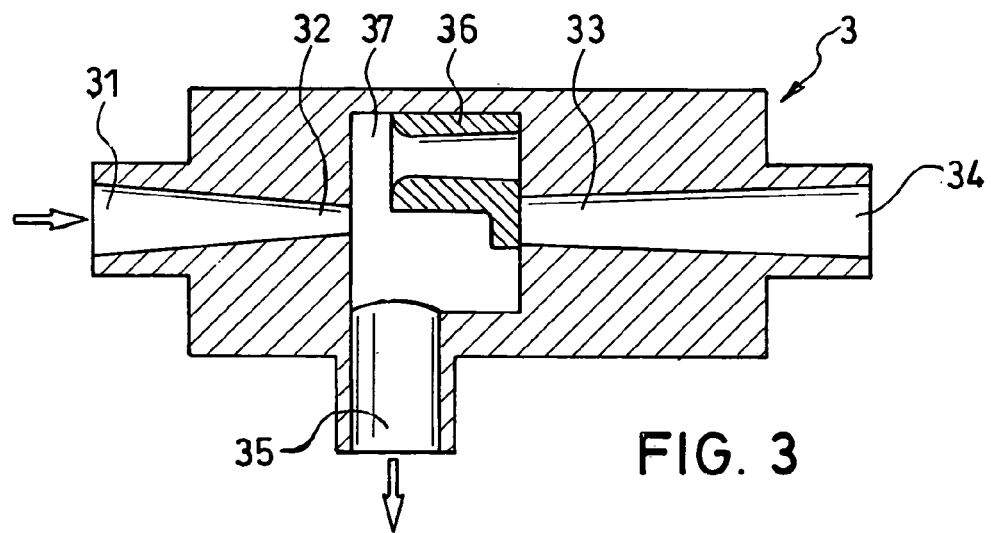
FIG. 3 shows the injector from FIG. 2 in the second slide position.

FIG. 3 illustrates the injector 3 in second operating mode in which the injector 3 functions as a valve. This second operating mode is enabled as a result of slide 36. That is, during the second operating mode, the slide 36 is pushed upward in the chamber 37 so that entry of fuel from the nozzle 32 into the diffuser 33 is prevented. Instead, the fuel fills the chamber 37 and leaves the chamber 37 via the intake opening 35.

In addition to the described fully open and blocking positions of the slide 36, intermediate positions of the slide are within the operating function of the invention in which the slide 36 is slightly displaced from the fully open position of the first operating mode. This changes the geometry of the diffuser 33 such that various settings of the ratio between the supplied fuel and the recirculated anode exhaust gas can be achieved.

The described combination between an injector and a valve is structurally very simple and much cheaper than providing separate nozzle and valve components.

The schematic of a combined injector/valve, shown in FIGS. 2 and 3, can also be used for an injector of a so-called "hydrogen system" in which hydrogen is the fuel for the fuel cell arrangement 1. In this embodiment, the anode exhaust gas is returned to the fuel cell arrangement 1 such that it is made available to the injector, located upstream of the fuel cell arrangement 1, for mixing with the hydrogen which has been supplied via the fuel line 5.

Figure 4:
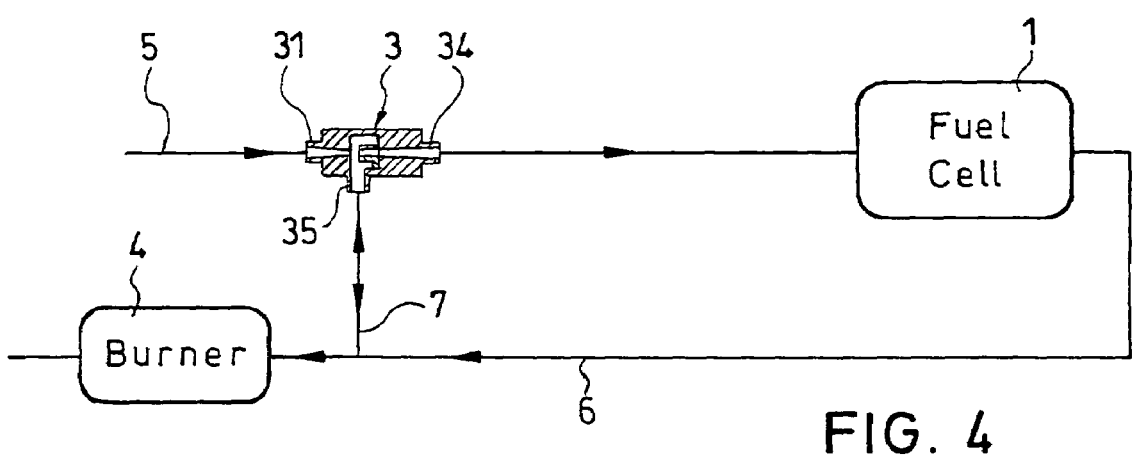
FIG. 4 shows a fuel cell system in which the injector is used to return the exhaust gas to a fuel cell arrangement.

While in a system as shown in FIG. 1, the injector 3 in the second valve operating mode leads to both the reformer 2 and also the fuel cell arrangement 3 being bridged. However, the injector 3, in the valve function in FIG. 4, results in only the fuel cell arrangement 1 being bridged. In this embodiment, in the starting phase of the fuel cell system, when the fuel cell arrangement 1 has not yet reached its operating temperature, the fuel is supplied via the intake opening 35 and the line section 7 to the burner 4.

In the embodiment of FIGS. 2 and 3, there is a slide 36 which executes a translational motion for opening and blocking the diffuser area 33. However, the invention also encompasses other configurations which perform the opening and blocking function of the above described slide 36.

What is claimed is:

1. A fuel cell system comprising:
   a fuel cell arrangement and
   an injector for returning exhaust gas of the fuel cell arrangement, the injector including,
      a fuel inlet opening,
      a nozzle extending from the fuel inlet opening,
      a diffuser having an outlet opening, a chamber between an outlet of the nozzle and an entry area of the diffuser, and an intake opening for feed of anode exhaust gas from the fuel cell arrangement to the chamber, wherein, within the chamber in an area adjacent the entry area of the diffuser, a valve is provided which has a passage therethrough and which is movable from a first position permitting the passage of the fuel from the nozzle to the outlet opening and second position preventing the passage of fuel from the nozzle to the outlet opening, the passage of the valve forming an inlet portion of the diffuser in said first position.

2. A fuel cell system comprising a fuel cell arrangement, a reformer for reforming a liquid or gaseous fuel into a fuel-containing gas, an injector for returning anode exhaust gas to the reformer, the injector including an inlet opening, a nozzle extending the inlet opening, a diffuser having an outlet opening, a chamber between an outlet; of the nozzle and an entry area of the diffuser, and an intake opening for feed of anode exhaust gas from the fuel cell arrangement to the chamber, wherein, within the chamber in an area adjacent the entry area of the diffuser, a valve is provided which has a passage therethrough and which is movable from a first position permitting the passage of the fuel from the nozzle to the outlet opening and a second position preventing the passage of fuel from the nozzle to the outlet opening, the passage in the valve forming inlet portion of the diffuser in said first position.

3. The fuel cell system of claim 1, wherein the intake opening is connected to both an anode exhaust of the fuel cell arrangement and a burner to enable diverting the fuel when the slide is in the second slide position.

4. The fuel cell system of claim 2, wherein the intake opening is connected to both an anode exhaust of the fuel cell arrangement and a burner to enable diverting the fuel when the slide is in the second slide position.

5. The fuel cell system of claim 1, wherein the valve is movable to intermediate positions between the first and the second positions such that the diffuser geometry in an area adjacent the entry area of the diffuser can be changed.

6. The fuel cell system of claim 2, wherein the valve is movable to intermediate positions between the first and the second positions such that the diffuser geometry in an area adjacent the entry area of the diffuser can be changed.

7. The fuel cell system of claim 3, wherein the valve is movable to intermediate positions between the first and the second positions such that the diffuser geometry in an area adjacent the entry area of the diffuser can be changed.

8. The fuel cell system of claim 4, wherein the valve is movable to intermediate positions between the first and the second positions such that the diffuser geometry in an area adjacent the entry area of the diffuser can be changed.

* * * * *